(12) United States Patent
Khoo

(10) Patent No.: US 11,102,316 B1
(45) Date of Patent: Aug. 24, 2021

(54) SYSTEM AND METHOD FOR TRACKING INTERACTIONS IN AN EMAIL

(71) Applicant: Justin Khoo, San Francisco, CA (US)

(72) Inventor: Justin Khoo, San Francisco, CA (US)

(*) Notice: Subject to any disclaimer, the term of this patent is extended or adjusted under 35 U.S.C. 154(b) by 0 days.

(21) Appl. No.: 16/361,140

(22) Filed: Mar. 21, 2019

Related U.S. Application Data

(60) Provisional application No. 62/646,351, filed on Mar. 21, 2018.

(51) Int. Cl.
| | |
|---|---|
| *G06F 17/22* | (2006.01) |
| *H04L 29/08* | (2006.01) |
| *G06F 3/0485* | (2013.01) |
| *G06F 3/0488* | (2013.01) |
| *H04L 12/58* | (2006.01) |
| *G06F 3/0484* | (2013.01) |
| *G06F 40/14* | (2020.01) |
| *G06F 40/166* | (2020.01) |

(52) U.S. Cl.
CPC ............ *H04L 67/22* (2013.01); *G06F 3/0485* (2013.01); *G06F 3/0488* (2013.01); *G06F 3/04842* (2013.01); *G06F 40/14* (2020.01); *G06F 40/166* (2020.01); *H04L 51/22* (2013.01); *H04L 67/02* (2013.01)

(58) Field of Classification Search
CPC ......... H04L 67/22; H04L 67/02; H04L 51/22; G06F 40/166; G06F 40/14; G06F 3/04842; G06F 3/0485; G06F 3/0488
USPC ....................................................... 715/240
See application file for complete search history.

(56) References Cited

U.S. PATENT DOCUMENTS

| | | | |
|---|---|---|---|
| 6,907,578 B2 | 6/2005 | Wilson et al. |
| 6,918,082 B1 | 7/2005 | Gross et al. |
| 7,219,131 B2 | 5/2007 | Banister et al. |
| 7,305,242 B2 | 12/2007 | Zakharia et al. |
| 7,627,814 B1 | 12/2009 | Soldan et al. |
| 7,814,410 B2 | 10/2010 | Kothari et al. |
| 7,900,149 B2 | 3/2011 | Hatcher et al. |
| 8,032,597 B2 | 10/2011 | Khoo |
| 8,285,813 B1 | 10/2012 | Colton et al. |
| 8,335,982 B1 | 12/2012 | Colton et al. |
| 8,527,860 B1 | 9/2013 | Colton et al. |
| 8,639,680 B1 | 1/2014 | Ciccolo et al. |
| 8,639,743 B1 | 1/2014 | Colton et al. |
| 8,719,451 B1 | 5/2014 | Colton et al. |

(Continued)

OTHER PUBLICATIONS

Campaign Wokhub, "The Only Proofing Solution Built For Email Campaigns", Available Online at <http://campaignworkhub.com:80/>, Accessed on Oct. 2, 2015, 5 pages.

(Continued)

*Primary Examiner* — Hassan Mrabi
(74) *Attorney, Agent, or Firm* — Nicholson De Vos Webster & Elliott, LLP

(57) ABSTRACT

A system and method to track whether users are viewing different sections of content in an email. The method and system tracks the scrolling behavior of recipients of an email by identifying the sections of an email that the recipients have viewed by tracking the touching of these sections in the case of a touch device or tracking of the cursor hovering over these sections in the case of a computer with a cursor and subsequently sending the activity to a remote server to be stored and aggregated.

24 Claims, 11 Drawing Sheets

(56) References Cited

U.S. PATENT DOCUMENTS

| | | | |
|---|---|---|---|
| 8,898,296 | B2 | 11/2014 | Zeng et al. |
| 8,959,426 | B1 | 2/2015 | Thakare et al. |
| 8,984,048 | B1 | 3/2015 | Maniscalco et al. |
| 9,218,267 | B1 | 12/2015 | Keller |
| 9,400,774 | B1 | 7/2016 | Kim et al. |
| 9,424,236 | B2 | 8/2016 | Sullivan et al. |
| 9,607,332 | B1* | 3/2017 | Nazarov ............ G06Q 30/0631 |
| 9,817,916 | B2 | 11/2017 | Flack |
| 10,031,549 | B2 | 7/2018 | Costa |
| 2001/0042098 | A1 | 11/2001 | Gupta et al. |
| 2004/0034688 | A1 | 2/2004 | Dunn |
| 2004/0234169 | A1 | 11/2004 | Tojo |
| 2004/0268261 | A1 | 12/2004 | Elliott et al. |
| 2005/0022116 | A1 | 1/2005 | Bowman et al. |
| 2005/0081159 | A1 | 4/2005 | Gupta et al. |
| 2005/0100143 | A1 | 5/2005 | Bedingfield |
| 2005/0246341 | A1 | 11/2005 | Vuattoux et al. |
| 2006/0023238 | A1 | 2/2006 | Blaszyk et al. |
| 2006/0174187 | A1 | 8/2006 | White et al. |
| 2007/0011258 | A1 | 1/2007 | Khoo |
| 2007/0038718 | A1 | 2/2007 | Khoo et al. |
| 2007/0201752 | A1 | 8/2007 | Gormish et al. |
| 2007/0211071 | A1 | 9/2007 | Slotznick et al. |
| 2008/0005247 | A9 | 1/2008 | Khoo |
| 2008/0307328 | A1 | 12/2008 | Hatcher et al. |
| 2009/0055187 | A1 | 2/2009 | Leventhal et al. |
| 2009/0112687 | A1 | 4/2009 | Blair et al. |
| 2010/0031366 | A1 | 2/2010 | Knight et al. |
| 2010/0241488 | A1 | 9/2010 | Jacobson |
| 2011/0113364 | A1 | 5/2011 | Neil et al. |
| 2011/0197133 | A1 | 8/2011 | Tarjan et al. |
| 2011/0202621 | A1 | 8/2011 | Laval |
| 2011/0258532 | A1 | 10/2011 | Ceze et al. |
| 2011/0314368 | A1 | 12/2011 | Chevalier |
| 2012/0110395 | A1 | 5/2012 | Gearhart et al. |
| 2012/0155292 | A1 | 6/2012 | Zazula et al. |
| 2012/0173967 | A1 | 7/2012 | Lillesveen |
| 2012/0215540 | A1 | 8/2012 | Goektekin |
| 2012/0245937 | A1 | 9/2012 | Thenthiruperai et al. |
| 2012/0278695 | A1 | 11/2012 | Ju et al. |
| 2012/0278700 | A1 | 11/2012 | Sullivan et al. |
| 2013/0007711 | A1 | 1/2013 | Fryc et al. |
| 2013/0046616 | A1 | 2/2013 | Williams et al. |
| 2013/0174010 | A1 | 7/2013 | Le et al. |
| 2013/0174011 | A1 | 7/2013 | Le et al. |
| 2013/0176344 | A1 | 7/2013 | Mandic et al. |
| 2013/0179776 | A1 | 7/2013 | Rossi et al. |
| 2013/0190021 | A1 | 7/2013 | Vieri et al. |
| 2013/0201107 | A1 | 8/2013 | Rossi et al. |
| 2013/0205277 | A1 | 8/2013 | Seven et al. |
| 2013/0219024 | A1 | 8/2013 | Flack |
| 2013/0290786 | A1 | 10/2013 | Artzi et al. |
| 2013/0325980 | A1 | 12/2013 | Ohayon |
| 2014/0123036 | A1 | 5/2014 | Bao et al. |
| 2014/0136944 | A1 | 5/2014 | Harris et al. |
| 2014/0282076 | A1 | 9/2014 | Fischer |
| 2015/0074518 | A1 | 3/2015 | Rumsey et al. |
| 2015/0082058 | A1 | 3/2015 | Hahm et al. |
| 2015/0161087 | A1* | 6/2015 | Khoo ............ G06F 16/957 715/234 |
| 2015/0180811 | A1 | 6/2015 | Cornwell et al. |
| 2015/0207804 | A1 | 7/2015 | Van et al. |
| 2015/0242380 | A1 | 8/2015 | Guo et al. |
| 2015/0309993 | A1 | 10/2015 | Wilde |
| 2016/0132937 | A1 | 5/2016 | Khoo et al. |
| 2016/0259773 | A1 | 9/2016 | Jadhav et al. |
| 2016/0284341 | A1 | 9/2016 | Hirakawa et al. |
| 2017/0018021 | A1 | 1/2017 | Shekhawat et al. |
| 2018/0247640 | A1 | 8/2018 | Yassa et al. |
| 2019/0044902 | A1* | 2/2019 | Teplow ............ G06Q 10/06 |
| 2019/0073342 | A1* | 3/2019 | Wilson ............ G06F 40/117 |
| 2020/0151223 | A1 | 5/2020 | Ly et al. |

OTHER PUBLICATIONS

Conceptshare-Tour, "Five Favorite Features Chosen by Customers", Available Online at <https://www.conceptshare.com/tour>, accessed on Oct. 27, 2018, 4 pages.

Dave, Shyamal, "Head to Litmus for Email Testing and Marketing Analytics Needs", Available Online at <https://yourstory.com/2012/08/litmus>, Aug. 13, 2012, 2 pages.

Deltek + Conceptshare, "New Feature List", Available Online at <http://www.conceptshare.com/new_features>, accessed on Oct. 29, 2018, 7 pages.

Email on Acid, "How Can I Run An Email Test?", Available Online at <https://www.emailonacid.com/help-article/how-can-i-run-an-email-test/>, accessed on Oct. 27, 2018, 7 pages.

Garsiel et al. , "How Browsers Work: Behind the Scenes of Modern Web Browsers", Available Online at <https://www.html5rocks.com/en/tutorials/internals/howbrowserswork/>, Aug. 5, 2011, 55 pages.

Invision, "Free Design Feedback and Collaboration Tool", Available Online at <https://www.invisionapp.com/tour/design-feedback-collaboration-tool/>, accessed on Oct. 27, 2018, 3 pages.

Iphonehacks, "How To Use a Mouse On Your iPad & iPhone [Jailbreak Tips]", Available Online at <https://www.iphonehacks.com/2012/10/how-to-use-a-mouse-on-the-ipad.html>, Oct. 7, 2012, 9 pages.

Litmus, "Verify and Check Your Email with Litmus Checklist", Available Online at <https://litmus.com/email-checklist#0>, accessed on Oct. 27, 2018, 7 pages.

Mark Goddard, "Fixing the HOver Event on the iPad/iPhone/iPod", Available Online at <http://blog.0100.tv/2010/05/fixing-the-hover-event-on-the-ipadiphoneipod/>, 2010, 6 pages.

Merriam-Webster, "Definition of Disable", Available Online at <https://www.merriam-webster.com/dictionary/disable#:~:text=%3A%20to%20make%20unable%20or%20incapable% 20He%20disabled%20the%20computer%20system>, accessed on Feb. 1, 2021, 12 pages.

Motto, Todd, "Building an HTML5 Responsive Menu with Media Queries and JavaScript—Ultimate Courses", Available Online at <https://ultimatecourses.com/blog/building-an-html5-responsive-menu-with-media-queries-javascript>, accessed on Feb. 1, 2021, 14 pages.

Pelago, "Sidecar: Emogrifier", Available Online at <https://web.archive.Org/web/20130425165247/http://www.pelagodesign.com/sidecar/emogrifier/>, Apr. 25, 2013, 2 pages.

Radford. EDU, "Style Sheet Locations for COMS326", Available Online at <https://www.radford.edu/~rstepno/326/csslocations.html>, Mar. 30, 2013, 2 pages.

Stack Overflow, "Jquery Preventing Hover Function On Touch", Available Online at <https://stackoverflow.com/questions/14388813/jquery-preventing-hover-function-on-touch>, Jan. 17, 2013, 11 pages.

Taligarsiel.com, "Behind the Scenes of Modern Web Browsers", Available Online at <http://taligarsiel.com/Projects/howbrowserswork1.htm>, 27 pages.

W3C Working Draft, "Document Object Model (DOM) Level 3 Events Specification", Available Online at <https://www.w3.org/TR/2013/WD-DOM-Level-3-Events-20131105/>, Nov. 5, 2013, 88 pages.

Wilson et al., "Touch And Mouse: Together Again for the First Time", Available Online at <https://www.html5rocks.com/en/mobile/touchandmouse/>, Mar. 13, 2013, 10 pages.

* cited by examiner

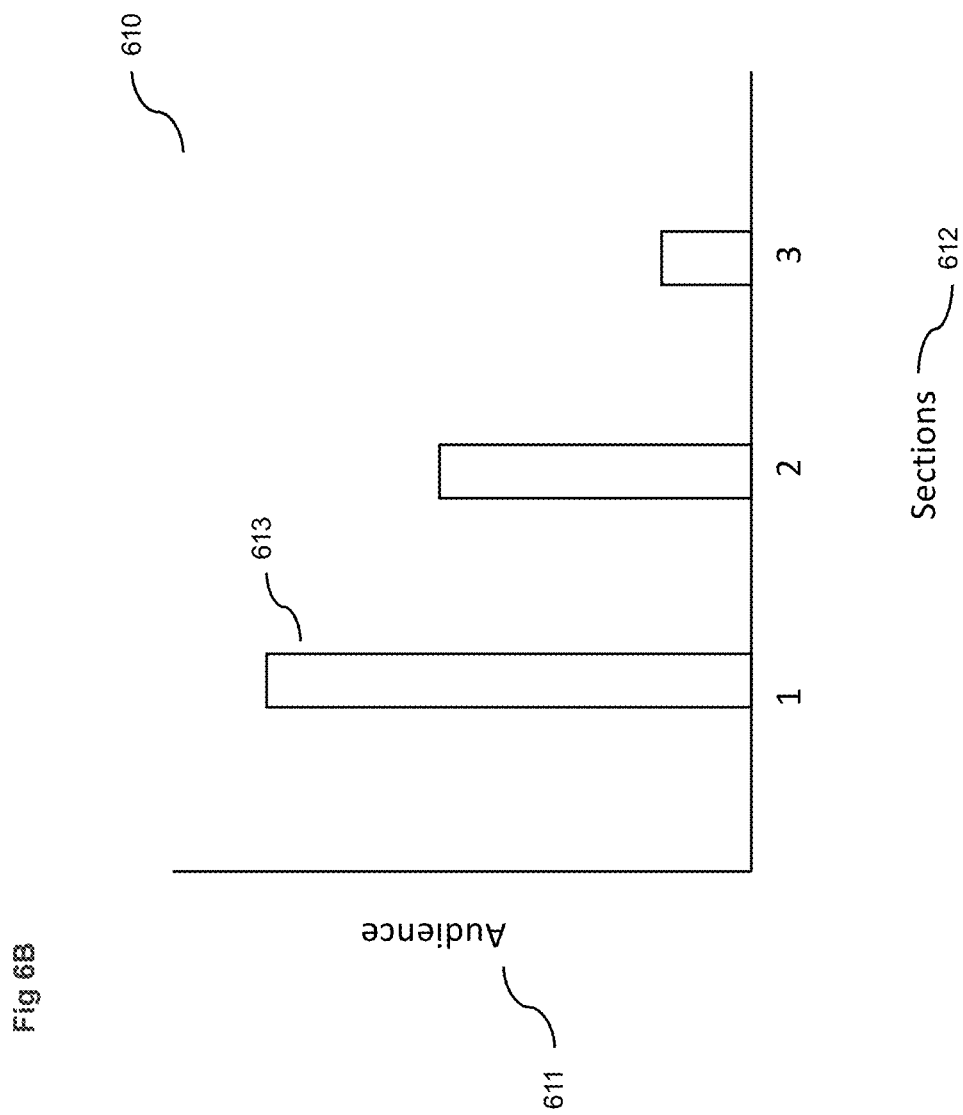

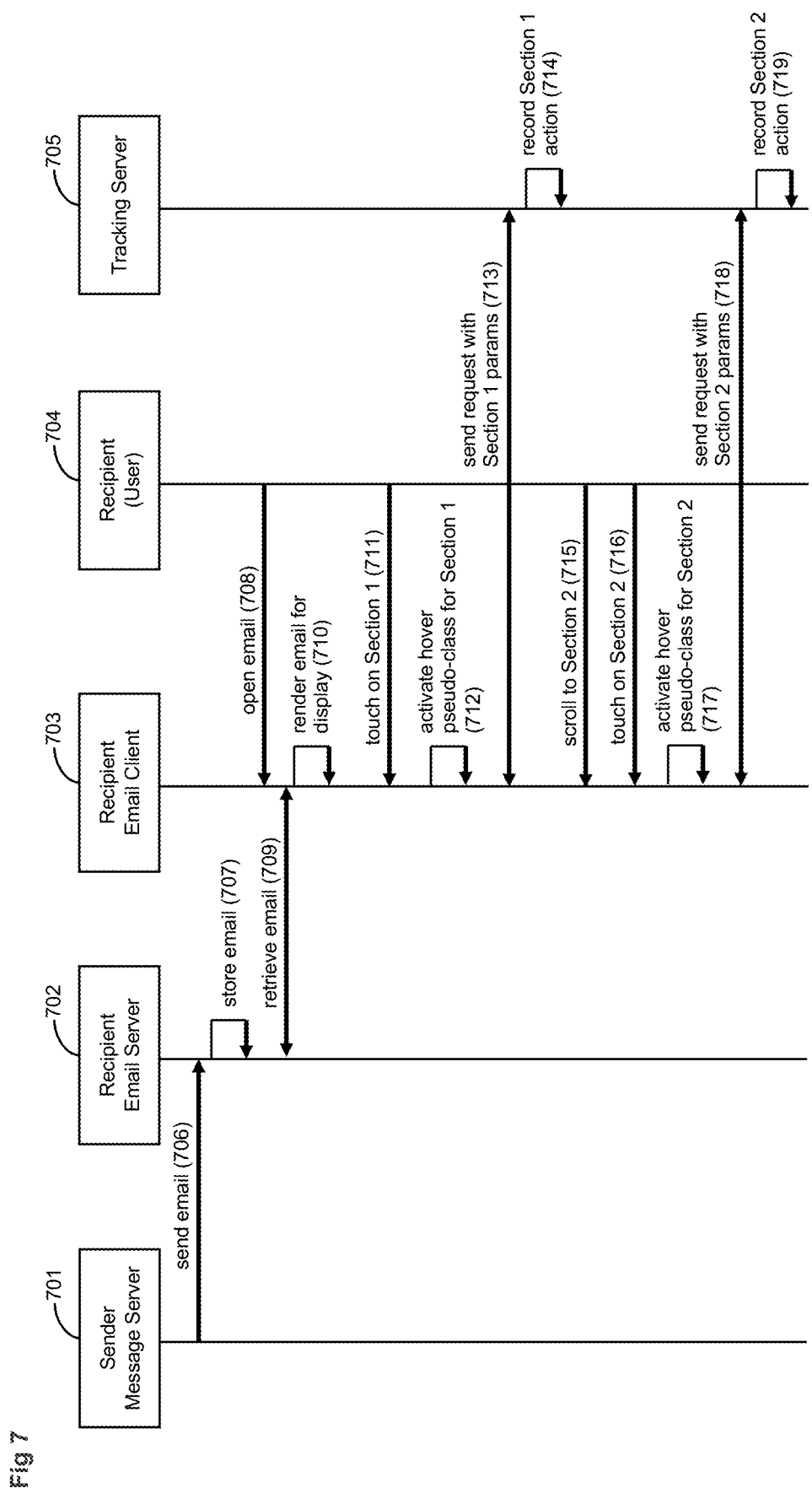

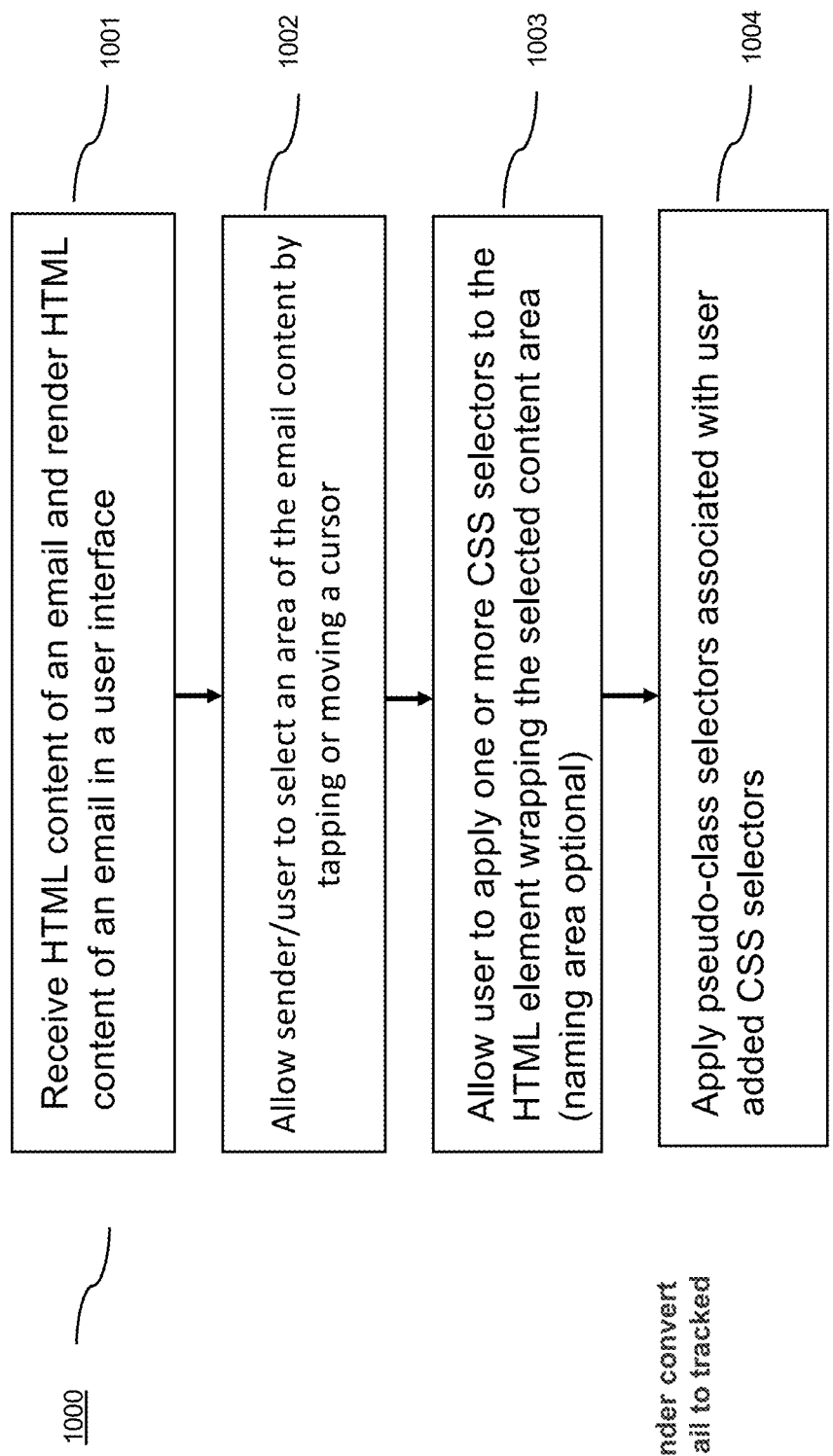

SYSTEM AND METHOD FOR TRACKING INTERACTIONS IN AN EMAIL

PRIORITY CLAIM

This application claims priority to U.S. Provisional 62/646,351, filed Mar. 21, 2018, entitled "System and Method for Tracking Interactions in an Email," which is incorporated by reference herein in its entirety.

FIELD OF THE INVENTION

The present invention relates generally to the area of tracking of user actions within an email (electronic mail) and more specifically to techniques for the tracking of content viewing behavior within an email.

BACKGROUND OF THE INVENTION

Tracking of user behavior on websites is well-known including the concept of "heat maps" where Javascript is used to track the movement of a user's cursor on a web page and the tracked information is used to generate a colored map of an aggregate of user cursor movements on the webpage, wherein the more highly trafficked sections are displayed as "hotter" colors like red and the less trafficked sections either remain white or receive "cooler" colors like blue. These heat maps allow a designer to know whether or not the design or layout of a webpage is optimal to get readers to read different sections of a webpage, resulting in a better and more optimal experience for the reader.

However, since Javascript is not supported in email, so far there has not been a method to track the viewing behavior of a user for email content. Furthermore, because touch devices, such as mobile phones with touch screens, do not incorporate a cursor, it is more difficult to track a users viewing behavior.

The closest method employed in approximating user viewing behavior of emails has been tracking the location of links within an email that are clicked by a reader. This technique enables indirect tracking of user behavior because when a user clicks on a link the user is taken to a remote server that tracks the link that is clicked. However, if a large section of the email content does not contain links, then it is not possible to know with this method if a user viewed the section of the email without links.

It would be useful to be able to track whether users are viewing different sections of content in an email without the use of links embedded within the email or in other contexts when Javascript tracking is unavailable or is not an option.

BRIEF DESCRIPTION OF THE DRAWINGS

Various embodiments of the invention are disclosed in the following detailed description and the accompanying drawings.

FIG. 6b is an illustration of a bar chart displaying distribution of tracked user actions according to an embodiment of the present invention.

FIG. 7 is an illustration of an interaction diagram displaying the various tracking interactions

FIG. 10 is a flowchart showing a method performed by an embodiment of the present invention.

DETAILED DESCRIPTION

Figure 1:
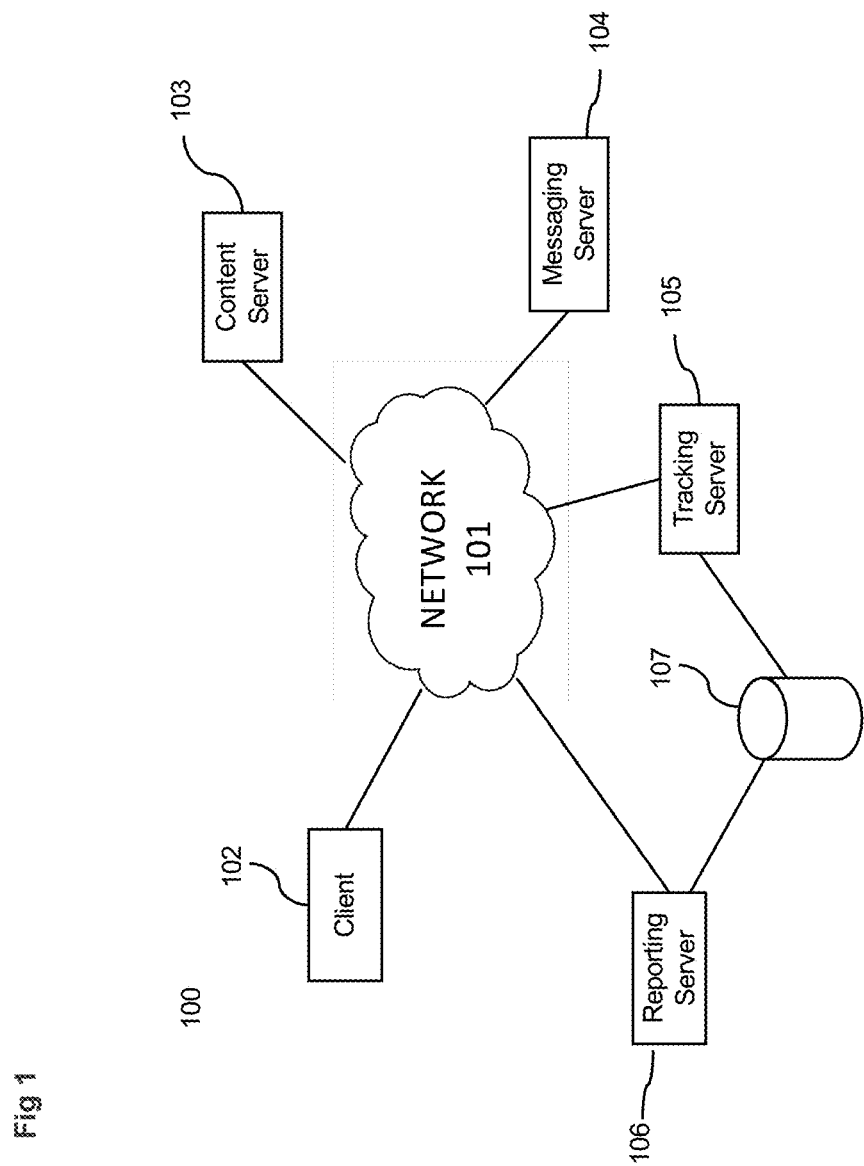
FIG. 1 is a diagram of a system for tracking user interaction with content, according to some embodiments of the present invention.

In the description above, the detailed description, the claims below, and in the accompanying drawings, references are made to particular features (including method steps) of the various embodiments of the invention. It is to be understood that the disclosure of the invention in this specification includes all possible combinations of such particular features, for example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. The following detailed description is, therefore, not to be taken in a limiting sense, and the scope of the present invention is defined only by the appended claims.

The embodiments of the present invention can be implemented in a variety of ways, such as a process, an apparatus, a system, a composition of matter, a computer readable medium (e.g. a computer readable storage medium), or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any particular embodiment or any particular set of such embodiments. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the following exemplary embodiments of the present invention pertain to implementations in the context of email, it can be appreciated by one of ordinary skill in the art that such techniques can also be applied to web pages as well—especially in instances where Javascript is not allowed or where a cursor is not used (e.g., on mobile devices). Therefore, the methods presented herein concerning tracking user viewing behavior can also be used on a web page or other appropriate context.

Some of the following implementations associate "class" and "id" with elements. However, it can be appreciated by a person of ordinary skill in the art that any combination of class, id or CSS selectors can be used to identify and associate style properties to elements.

In the following disclosure the term "touch" refers to a touch of an interface with a finger, whereas the term "tap" refers to a brief touch and lift of a finger on an interface. A touch-based interface is where the primary interaction with a user interface is through touching the interface as opposed to interacting with the interface via a peripheral pointing device such as a mouse. Using a mouse is considered to refer to a circumstance where movement of the mouse moves a cursor on a screen.

The term user and recipient are used interchangeably to mean a person receiving an email and interacting with an email on an email client.

FIG. 1 is a diagram of a system for the retrieval and tracking of viewership of content in accordance with an embodiment of the present invention. It will be understood that such content may include html, but the content is not required to include HTML. In this example embodiment, a client or user device 102 is connected to a network 101. A client 102 may be any device capable of receiving content, including, but not limited to, devices such as a personal computer, PDA, tablet, personal computing device, or cell phone. The network 101 may be any type of network, for example: a public network such as the Internet or a cellular phone network; a private network such as a home network; or a combination of both.

In accordance with embodiments of the present invention, a client may receive a message from a message server 104. In some embodiments, the message may be an email and the message server 104 may be an email server. When a message is opened in the client 102, associated message content may be loaded from a content server 103 or another appropriate source. In an alternate embodiment, the content server 103 is a web server and the client 102 is a web browser that loads content from the content server 103. In some embodiments of the present invention, when a user interacts with a message or elements within a message, the actions may cause the client to make network calls to log such interactions on a tracking server 105. Interactions sent to a tracking server 105 may be stored on a database 107. A reporting server 106 connected to the database 107 may obtain stored tracking data to present to a user in an aggregated report. The client 102 is an email client such as, for example, an email client for the reading of emails on a mobile phone, or personal computer, or a web-based email where a user uses a browser to access a remote service such as Gmail.com. (GMAIL is a registered trademark of Google Inc.) Depending on the configuration of the client 102, the email may be stored in the client such in the case of a mobile device client, or a separate recipient messaging server in the case of a webmail client.

It can be appreciated by one of ordinary skill in the art that the various servers 103, 104, 105, and 106 represent logical units and they may physically be in disparate locations, may be physically located in a single location or machine, or may be dispersed among multiple locations and multiple machines.

Tracking User View Behavior in a Message

Figure 2:
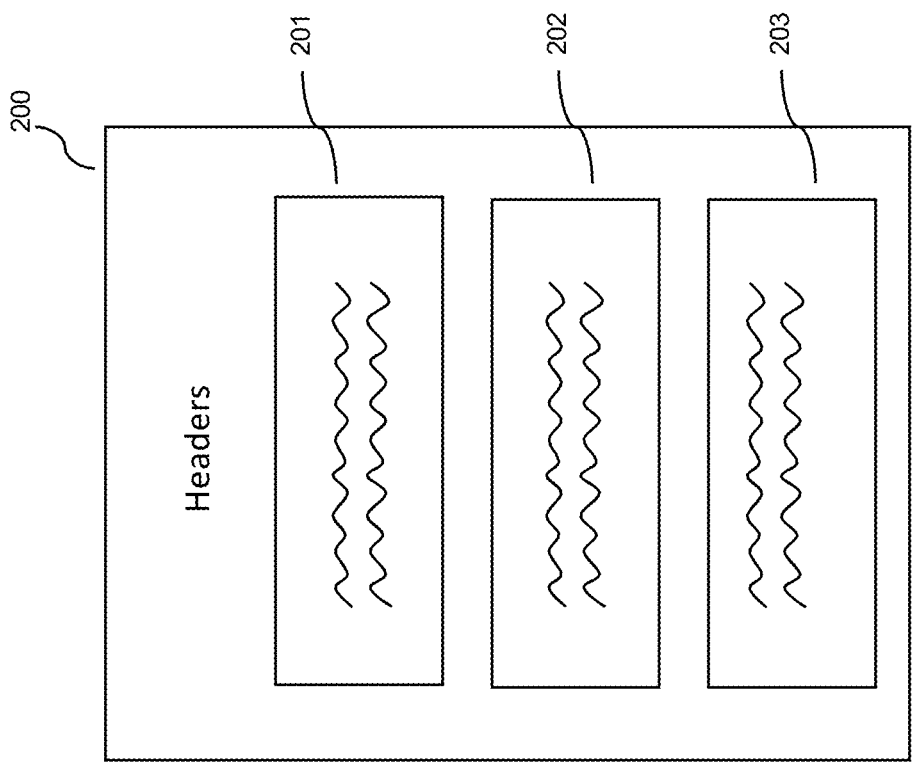
FIG. 2 is an illustration of content containing multiple tracked sections according to an embodiment of the present invention.

In one embodiment of the invention, tracking of user viewing behavior with respect to content is implemented by the hover of a cursor or touch of a finger upon a section of content making the section a tracked section. FIG. 2 illustrates an example of content within a message 200 that is broken up into tracked sections 201, 202, 203. Each section is an HTML element such as DIV or a table cell that wraps content which may include text, imagery, or other elements. It will be understood that not all of a particular message may fit on a particular display screen and that the user will need to scroll the message to see all of its contents.

In order to track a touch or hover of a cursor on each tracked section, in this embodiment, an image is loaded using a pseudo-class associated with such section. In a preferred embodiment of the invention, the "hover" pseudo-class" is used: However, other pseudo-classes such as focus, active, and target may be used as well.

The following is an example of HTML code for a section that wraps text. The tracked section contains a class "section1".

<div class="section1">
Text in section
</div>

The following style example is an illustrative embodiment of a hover pseudo-class associated with a tracked section "section1" which will be activated when a user touches or hovers the cursor over the tracked section. When the pseudo-class is activated, a tracked image is loaded as a background image from a tracking server 105. The URL of the tracked image is encoded with an identifier value associated with the section (section1) allowing the tracking server to distinguish the different sections that have been activated by a user. As an example, the identifier value may be a parameter value in the URL, where the parameter value for "sectionID" is associated with a particular section of the email.

.section1:hover {
   background-image: url(http://www.tracking-server.com/track?section=section1);
}

In order to make the tracked image transparent to the user, the tracked image can be a transparent one, or, alternatively added background styling can be employed to hide the image from the user as in the example below—specifically setting the background size to 0 px and the background-repeat to "no-repeat":

.section1: hover {
   background-image: url(http://www.tracking-server.com/track?section=section1);
   background-size: 0 px;
   background-repeat: no-repeat;
}

In the example depicted in FIG. 2 showing content 200, the content is broken up into three tracked sections, where a users tap or hover over a section will trigger the loading of its respectively associated tracked image. Ideally, tracked sections are stacked vertically in the layout of a page without overlapping with an ideal section size being approximately the height and width of the window of the client that the content is viewed in. Ideally, a tracked section spans as wide as the widest content in a page. This allows the ability to track the scrolling of content since the activation of a tracked section below the first tracked section signifies that the user has at least scrolled the content in order to access it. In addition, activation of a single tracked section that is known to not be displayed when the email is initially viewed on a particular screen allows the tracking server to determine that scrolling has occurred, since the recipient would have had to scroll to view and activate the tracked section.

With this setup, it can be deduced that as users touch or hover their cursor over a piece of content, that the user has viewed that piece of content and the tracking image associated that is retrieved from the tracking server will record the sections as having been viewed. This allows the tracking on how far a viewer has scrolled the content wherein detection of an interaction at the most bottom tracked section signifies that a viewer has scrolled the distance from the top of the content to the bottom-most tracked section.

It is also advantageous that the tracked sections are placed contiguously so that there is a minimal or no vertical gap between neighboring tracked sections so that a user's finger will always be touching a tracked section when they are touching the screen to scroll the content. It is therefore advantageous that any vertical gap be less than the size of a tap area.

Activating Element Touch Sensitivity with "Touch-Active" Activating Elements

In certain touch based operating systems such as Android, merely touching a section of content will automatically trigger the "hover" or "active" pseudo-class associated with a section. However, in the iOS operating system, only certain elements will trigger pseudo-classes such as "hover" and "active". (ANDROID is a trademark of Google Inc.; IOS is a trademark of Apple Inc.) Such elements include the label, link and image elements. Therefore, in order to make elements that don't respond to hover events in iOS such as a DIV tag, table cells and text sensitive to touch events and trigger associated pseudo-classes the invention uses the technique described below in order to make these elements "touch-active".

The term "touch-active" for an element, as used herein, means that the element will trigger the "hover" pseudo-class when a user touches the element.

In the iOS operating system making elements touch-active normally involves adding Javascript event attributes to an element such as ontouchstart, ontouchmove or ontouchend. However, since emails do not support Javascript, such attributes are not available.

Figure 3A:
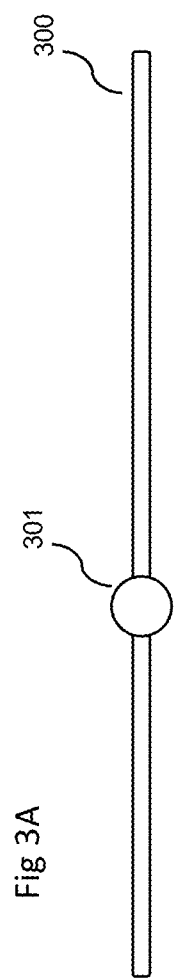
FIGS. 3a and 3b is an illustration of types of content elements exhibiting "touch-active" activating capabilities according to an embodiment of the present invention.
Figure 3B:
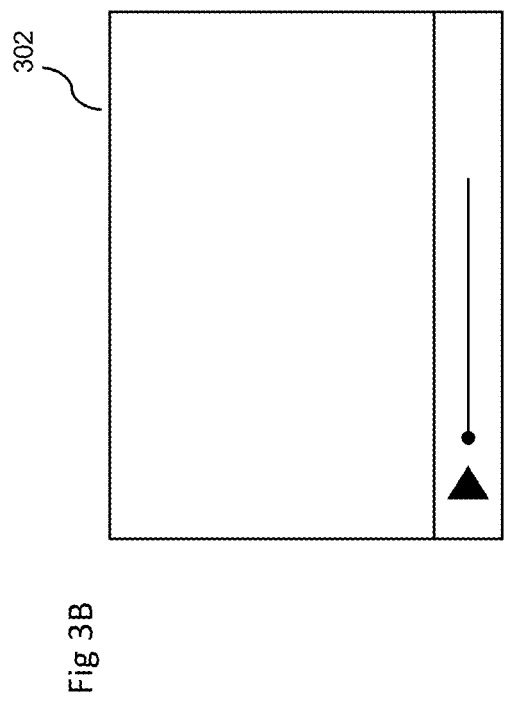

In one embodiment of the present invention, in order to make non-touch-active elements touch-active in iOS, a touch-active activating element is positioned and sized under the non-touch-active element. By having a touch-active activating element under a non-touch-active element, such non-active-element become touch-active. Touch-active activating elements may include slider thumb elements of an HTML5 range input element, the HTML5 video elements, as well the HTML5 audio elements. An example of an HTML5 range input element 300 is shown in FIG. 3A that is depicted as incorporating a thumb slider 301. An example of an HTML5 video element 302 is shown in FIG. 3B. Elements 300 and 302 are unstyled version of elements. As described below, when styled (into a rectangle) and put underneath non-touch-active elements they make those elements touch-active (i.e. these non-touch-active elements now trigger :hover and :active pseudo-classes when touched).

Figure 4:
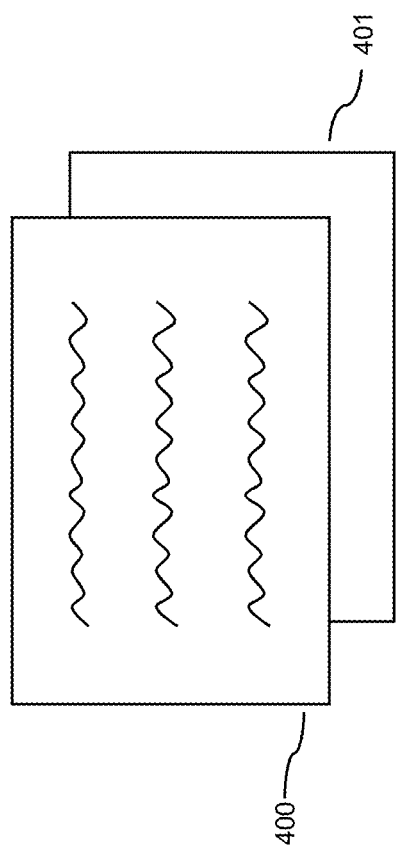
FIG. 4 is an illustration of a tracked content placed above a "touch-active" activating element according to an embodiment of the present invention.

FIG. 4 illustrates an embodiment of a tracked section 400 with a touch-active activating element 401 positioned under the section.

In one embodiment of the invention a single touch-active activating element is sized and positioned under substantially all the tracked sections so that only one touch-active activating element is required. Alternative methods of positioning and sizing elements are familiar to those of ordinary in the art.

The following is an example of positioning and sizing a video element under three tracked sections of content in accordance with an embodiment of the present invention. A wrapper element that wraps all the tracked sections is added with a class "wrapper" that has its position style attribute set to "relative". A video element is then placed within the wrapper element. The video element is styled with its position style set to absolute and its top style set to 0 px, its width set to 100% and its min-height style set to 100%. In this embodiment, to make the video element appear under the sections, its z-index style is set to −1 and to make the video element invisible, the opacity is set to 0.

```
<div class="wrapper">
<video class="videolayer" controls="controls"></video>
  <div class="section1">Text for section 1</div>
  <div class="section2">Text for section 2</div>
  <div class="section3">Text for section 3</div>
</div>
<style>
.wrapper{
  position: relative;
}
.videolayer{
  opacity: 0;
  position: absolute;
  top: 0 px;
  z-index: −1;
  width: 100%;
  min-height: 100%;
}
.section1:hover {
  background-image: url(http://www.tracking-server.com/track?section=section1);
}
.section2:hover {
  background-image: url(http://www.tracking-server.com/track?section=section2);
}
.section3:hover {
  background-image: url(http://www.tracking-server.com/track?section=section3);
}
</style>
```

An alternative implementation method is substituting the video element with a range input element and styling the thumb slider. The following example shows the styling of a range input element with the class "range1" in accordance with another embodiment of the present invention. In the iOS operating system as well as for Webkit based clients, the range input element contains default styling. In order to disable the default styling, the range input element and its associated components (slider-runnable-track, slider-thumb) are set to the style "-webkit-appearance:none;", then the slider thumb is given the same style properties given to the video element in the last example, by setting the CSS selector ".range1::-webkit-slider-thumb". (WEBKIT is a trademark of Apple, Inc.)

```
<div class="wrapper">
<input class="range1" type='range'/>
  <div class="section1">Text for section 1</div>
  <div class="section2">Text for section 2</div>
  <div class="section3">Text for section 3</div>
```

```
</div>
<style>
.wrapper{
    position: relative;
}
.range1, .range1::-webkit-slider-runnable-track, .range1::-webkit-slider-thumb {
    webkit-appearance: none;
}
.range1::-webkit-slider-thumb{
    opacity: 0;
    position: absolute;
    top: 0 px;
    z-index: −1;
    width: 100%;
    min-height: 100%;
}
.section1:hover {
    background-image: url(http://www.tracking-server.com/track?section=section1);
}
.section2:hover {
    background-image: url(http://www.tracking-server.com/track?section=section2);
}
.section3:hover {
    background-image: url(http://www.tracking-server.com/track?section=section3);
}
</style>
```

The aforementioned examples are two ways to position touch-active activating elements underneath tracked sections but other methods such as placing individual touch-active activating elements underneath individual tracked sections can be used and other touch active activating elements can be employed without departing from the spirit and scope of the present invention.

Touch-Active Trigger of Element Display

In embodiments of the present invention, with the touch-active activating elements underneath tracked sections, it is possible to trigger the display or animation of elements of a particular tracked section when a user scrolls to a particular tracked section by touching content that is not originally touch-active within a tracked section. This is achieved by associating style changes of content within a tracked section to the activation of a "hover" pseudoclass associated with the section and having the section becoming touch-active by placing touch-active activating elements under the section.

Figure 5:
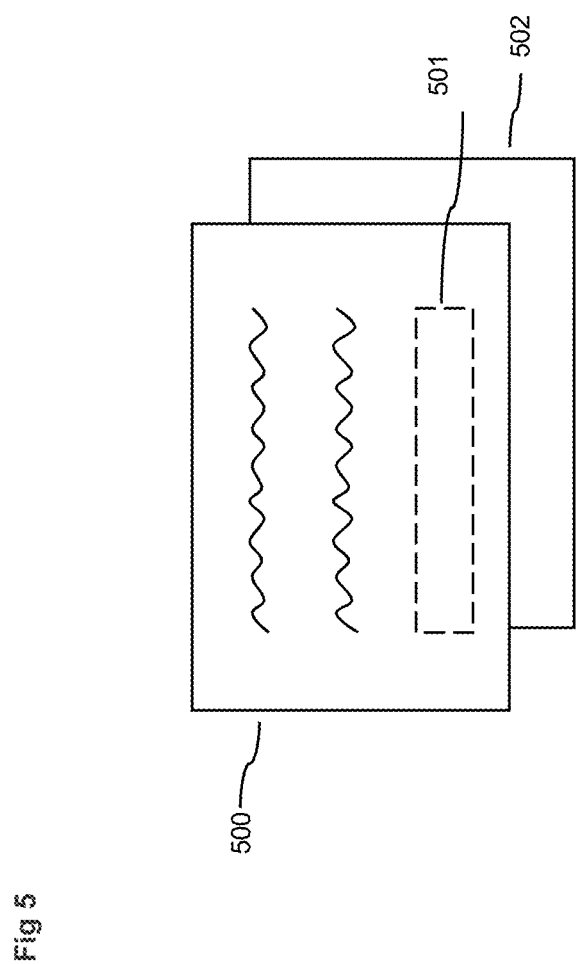
FIG. 5 is an illustration of interactive content placed above a "touch-active" activating element according to an embodiment of the present invention.

FIG. 5 is an illustration of interactive content placed above a "touch-active" activating element according to an embodiment of the present invention. Section 500 illustrated in FIG. 5 is shown as a tracked section with a touch-active activating element 502 underneath it. There is a hidden content element 501 that is initially hidden when the message initially displays but is displayed when a user scrolls to the section 500 and therefore touches the section 500.

The following example uses a video element as a touch-active activating element and initially sets the div element with the class "hidden-content" to a height of 0 px and overflow attribute hidden, effectively hiding the content within in accordance with an embodiment of the present invention. In this embodiment, when a user scrolls to the section by touching the section, the hover pseudo-class associated with the section is activated displaying content within the hidden element by increasing the height of the initially hidden element.

It is advantageous to add a delay before displaying the content so as to give the user the impression that the content was initially hidden by setting a transition-delay attribute and it is also advantageous to show an animated expansion of the element by having a transition of the height of the hidden element from 0 px. The hover pseudo-class can also be associated with CSS animations such as fading in or sliding in from the edges.

```
<div class="wrapper">
    <video class="videolayer" controls="controls"></video>
    <div class="section1">
    Some text<BR>
        <div class="hidden-content">This is initially hidden</div>
    </div>
</div>
<style>
.wrapper{
    position: relative;
}
.videolayer{
    opacity: 0;
    position: absolute;
    top: 0 px;
    z-index: −1;
    width: 100%;
    min-height: 100%;
}
.hidden-content{
    height: 0 px;
    overflow: hidden;
}
.section1:hover .hidden-content{
    height: 100 px;
    transition: 2 s;
    transition-delay: 1 s;
}
```

Tracking Scenario

FIGS. 7, 8a, 8b and 8c show an example of the interactions between various components of the invention wherein a recipient opens an email on an email client and proceeds to scroll from one section of an email to another and how the interactions are tracked.

Figure 8C:
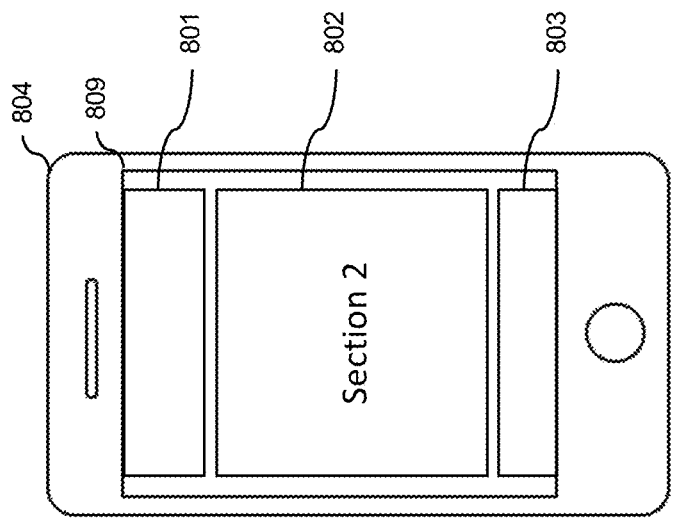
FIGS. 8a, 8b and 8c are illustration of an email displayed within an exemplary email client.
Figure 8B:
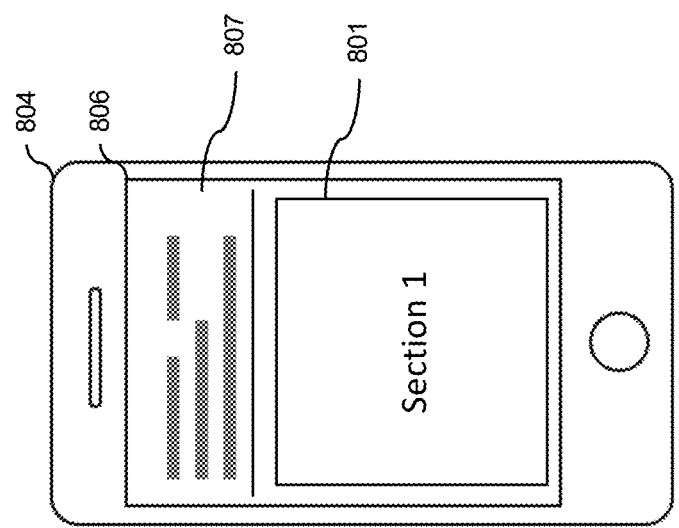
Figure 8A:
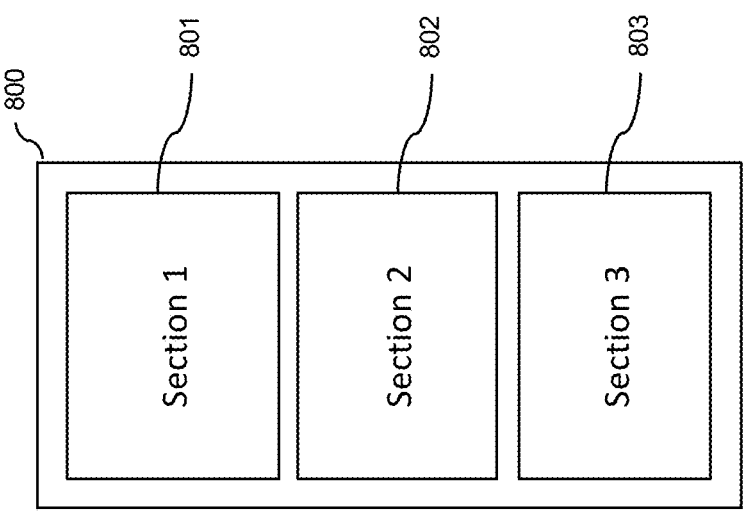

FIG. 8a is an example of an email 800 with three tracked sections (section 1 801, section 2 802 and section 3 803). The email 800 contains the tracking pseudo-classes that track each individual section. When each tracking pseudo-class is activated, the email client will make a request to a remote server using a URL encoded with the appropriate section identifier having a section identifier value associated with the section, as discussed above. In this example, each URL also contains a campaign identifier and recipient identifier.

FIG. 7 shows an interaction diagram containing a Sender Message Server 701 that sends an email 706 containing tracked sections 801, 802, 803 to a Recipient Email Server 702 which stores the email 707. At a later time, a recipient 704, such as a human user for example, uses an email client 703 to read the sent email by opening the email 708. The email client that sends 709 a request for the email to, for example, email server 702 (or the email could already be stored within the client 703—the configuration may vary depending on the setup of the email client). In this example, in response to the request 709 recipient email server 702 sends 720 the email to recipient email client 703. The email is then rendered in the client 703 for display 710.

In one embodiment of the invention the email is sent to multiple recipients, resulting in a plurality of instances of the email that are received by a plurality of recipients. The instances are not always identical. For example, URLs within the instances may be coded with an identifier unique to the recipient and may be personalized. Thus. In such an embodiment, there are multiple recipient email clients 703 and multiple recipients (users) 704, each of which are taking part in the interaction shown in FIG. 7. In such an embodiment, tracking server 705 receives requests from the plurality of email clients as the plurality of recipients read their own instances of the email. It is desirable to aggregate these multiple requests as discussed herein in connection with the tracking server's aggregation in, for example FIGS. 6A and 6B.

FIG. 8b is an example of an email client within a mobile device 804, with the rendered email displayed in a window 806. When the email is initially rendered the email header is displayed 807, which contains information such as the email sender and subject line, as well as the top part of the email 800. In this example only section 1 801 (and the header) is visible in the window. Which elements are visible would depend on the arrangement of sections within a particular email.

In order to read more content in the email, a user may have to scroll. On a mobile device a recipient may touch the rendered email to scroll optionally touching section 1 801.

When a user touches section 1 801 the email client receives a touch event 711 on section 1. This causes the hover event associated with section 1 to activate 712. This causes the email client to retrieve a URL from a server sending, for example, the section identifier, recipient identifier, and campaign identifier to a tracking server 705 as part of the request. It will be understood that other embodiments of the invention may include some subset of these identifiers (or other appropriate identifiers). In one embodiment, notification is sent to the tracking server when the email is opened as well. The tracking server 705 then records the identifiers in storage 714. The recipient is recorded to have viewed and scrolled to section 1 of the email in the campaign associated with the campaign identifier. Tracking server 705 then returns content with the request to the client 703. The content may not be visible to the user as discussed above.

The recipient continues to scroll until section 2 is visible in the screen 715.

FIG. 8c is an example of an email client within a mobile device 804, with the rendered email scrolled to section 2 802 in the window 809.

When a user touches section 2 802 the email client receives a touch event 716 on section 2. This causes the hover event associated with section 2 to activate 717. This causes the email client to request a URL from a server sending 718 the section identifier, recipient identifier, and campaign identifier to a tracking server 705. The tracking server then records 719 the identifiers in storage, such as database 107 and returns content associated with the request. The content may not be visible to the user as discussed above. The recipient is recorded 718 to have viewed and scrolled to section 2 of the email in the campaign associated with the campaign identifier in a database 107, for example.

Although the example above uses an email client in a mobile device, other forms of email clients may be used for example email clients that use a cursor pointing device. In such a case the cursor hovering over the various abovementioned sections would trigger the interactions at 711, 712, 718 and 717.

Tracking Repeated User View Events on Tracked Sections

A limitation on using background image triggered by a "hover" pseudo-class is that if a user triggers the loading of a tracking image on a first tracked section, goes to another tracked section, and then returns to trigger the pseudo-class in the first tracked section, the client or browser may not reload the tracking image since it has been cached by the client.

In certain clients, such as in the Android operating system and the Chrome browser, background images referenced by CSS animations are only retrieved and loaded when the background-image referenced is actually displayed according to the timeline set by the animations @keyframe declaration. (CHROME is a trademark of Google Inc.)

By associating a CSS animation to be played with the triggering of a "hover" pseudoclass on a particular tracked section and having the CSS animation reference a series of tracking images set to display consecutively over a period of time, not only can the duration of a user's view on a tracked section be determined as the series of tracking images are loaded, by having the animation be paused when the "hover" pseudo-class is not active and resume when it becomes active, it also becomes possible to track a user visiting the section multiple times.

The following is an example of a section that is configured with a CSS animation "trackanim" that is set to run for 8 seconds but that is initially set to paused (animation-play-state) in accordance with an embodiment of the present invention. In this embodiment, the trackanim @keyframe starts with (0%) no background image.

When a user triggers the "hover" pseudo-class associated with the tracked section by hovering the cursor of the tracked section or touching the section, the animation resumes (animation-play-state: running). This causes a series of tracking images to be retrieved from a tracking server. Each tracking image in the series has a unique URL so that they are not cached. In this exemplary embodiment, there are four tracking images that are loaded over a span of 8 seconds. Therefore, each subsequent tracking image is loaded every 2 seconds allowing for the ability to track how long a user has triggered the "hover" pseudo-class. Since the animation is paused when a user activates the pseudo-class of another tracked section and resumes when the user reactivates the pseudo-class of the first tracked section, it is possible, in this embodiment, for the tracking server to track multiple triggering of a section within its tracking duration (in this case 8 seconds).

```
<div class="section1">Text for section 1</div>
<style>
.section1{
   animation: trackanim 8 s step(1, end) forwards;
   animation-play-state: paused;
}
.section1:hover{
   animation-play-state: running;
}
@keyframes trackanim{
   0%{
      background-image: none;
   }
   1%{
      background-image:    url(http://www.tracking-server
         .com/track?section=section1A)
   }
   25%{
      background-image:    url(http://www.tracking-server
         .com/track?section=section1B)
   }
   50%{
```

```
    background-image:    url(http://www.tracking-server-
        .com/track?section=section1C)
}
75%, 100%{
    background-image:    url(http://www.tracking-server-
        .com/track?section=section1D)
    }
}
</style>
```

Tracking Parameters

In the aforementioned examples, the section identifiers are added to each URL of a requested tracking image to track a user's triggering of pseudo-classes on particular sections of content. In a preferred embodiment of the invention, in addition to the section identifiers, other parameters are added to the URL to allow more granular tracking.

In one embodiment of the invention the following identifiers are appended to the URL tracking the interaction of a user within an email. A campaign identifier may be appended to the URL. The campaign identifier will be identical in all tracked URLs in all the emails sent in a campaign allowing the tracking server to distinguish scrolling behavior across a campaign. (Alternately, tracking server 705 may keep track of which content identifiers belong to which campaign so that campaigns can be tracked without sending an explicit campaign identifier.) A recipient identifier also may be added to the URL allow the tracking server to uniquely identify triggering of sessions by recipients. The recipient identifier is unique to each recipient receiving the email and is appended to all tracked URLs within an email that the recipient receives.

The URL below incorporates three tracking parameters: section identifier (section1), campaign identifier (Campaign1) and recipient identifier (Recipient1000):
http://www.tracking-server.com/
track?section=section1&campaign=Campaign1&recipient=Recipient1000

In embodiments of the present invention the tracking server may also detect the type of device that is retrieving the tracking image from matching the user agent string of the request against a preset database of device user agent strings and storing the device information into a database. This identification can be cleaned from the User Agent metadata that is provided by the client when retrieving the request from the tracking server. The tracking server may further store the IP address of the originator of the tracking image retrieval request as well.

All the tracking data of requests may be stored, for example, in a tracking database 107 depicted in FIG. 1. In one embodiment, the URL requested by the email client from the remote server is further encoded with a user identifier having a value associated with the user/recipient. The remote server records the user identifier value and uses the combination of the section identifier value and the user identifier value from multiple requests to determine the unique number of users that have scrolled to the first content container.

Reporting of Tracking Activity

Figure 6A:
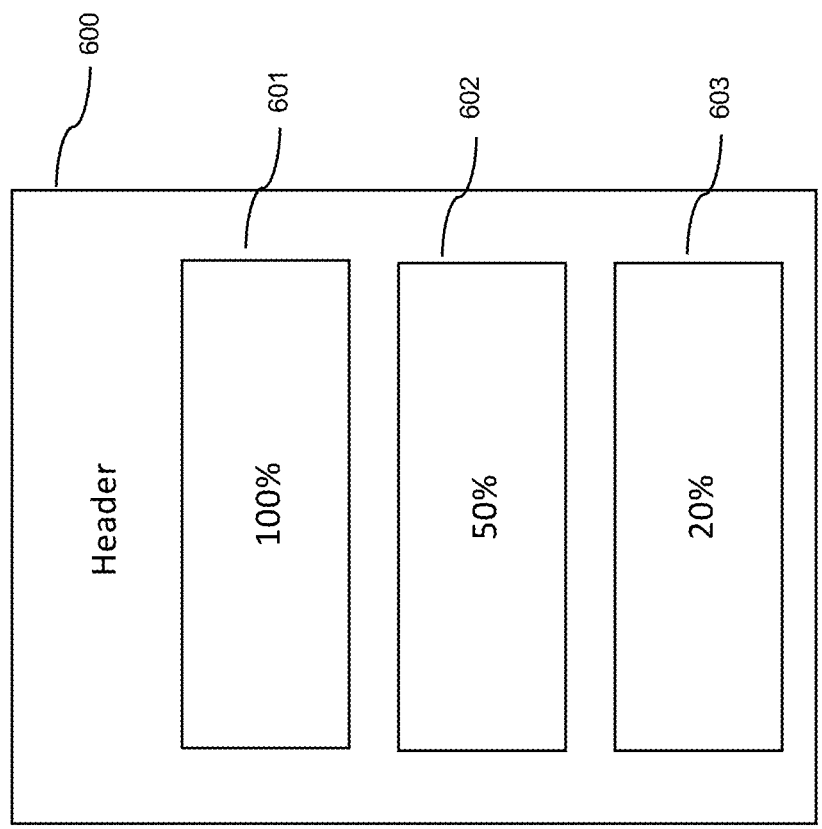
FIG. 6a is an illustration of a visual report "heat map" displaying areas of tracked user actions according to an embodiment of the present invention.

A reporting server 106 can be used by a sender to view the aggregated tracking results. For example, a sender who is sending multiple copies of an email to multiple recipients as part of an email campaign may want to track the recipients' interaction with their respective copies of the email. FIG. 6A shows an example of a sender viewing "heat map" that overlays view information over a visual representation of an email 600 in accordance with an embodiment of the present invention. In this example embodiment there are three tracked sections 601, 602, and 603. The reporting server 106 is connected to a tracking database 107 and retrieves the data of retrieval of tracking images. In one embodiment of the invention, the data relates to the campaign associated with a tracking image, and unique recipient identifier as well as the section identifiers.

In one embodiment, the report then overlays information related to the volume of tracking events associated with a particular section for a particular campaign. This would involve aggregating the interaction data from multiple recipients. Information may include the total number of tracking events for a tracked section, the percentage of recipients that viewed a specific section by triggering the "hover" pseudo-class for the particular section and retrieving the tracking image associated with a particular section— compared to the number of recipients that viewed the content or message. It could also specify the total number of recipients whose data was aggregated. In another version of FIG. 6A, total numbers are shown instead of percentages. In another example, the sender might want to filter the scrolling behavior of different groups of users based on some criteria (i.e., male/female, device used etc.)

Another report, depicted in FIG. 6B, shows the drop off of the number of viewers in each section as a bar graph 610 with the Y axis being the audience 611 or number of viewers/interactors and the X axis 612 as the section identifier (i.e., showing results for sections 1, 3, and 3).

Additionally the data collected by the tracking server can be used as a measure of how long a recipient has spent reading the email. By measuring the first and last tracked interactions the user within a preset window—less than 5 minutes, the recipient can be recorded as having spent the time reading the email. Reports can then be generated where recipients are grouped into categories signifying different lengths of time viewing and email as well as well as the amount of scrolling done (for example, number of scrolling activities while reading the email as well as sections scrolled).

Additionally the data collected by the tracking server can be compared with other email tracking data to determine the relative rate of scrolling against these other tracking data. For example, the scrolling data may be compared to email open data to determine the number or percentage of recipients who open an email and subsequently scrolled or who did not scroll. Email open tracking involves encoding a pixel or image with a campaign identifier and recipient identifier and the retrieval of the image when an email is opened results in a request to a tracking server. Methods of tracking email open among recipients of an email are known to those of ordinary skill in the art.

Appending of Tracking Code to Content

FIG. 10 is a flowchart showing a method performed by a further embodiment of the invention. In this embodiment, a user interface is used to allow a user/email sender to attach CSS selectors to sections of content in an HTML page or email in order to convert the sections into tracked sections. Such a user interface allows for the pasting of HTML content of an email and rendering of the HTML content within a user interface 1001. The user/sender is then given the ability to select an area of the email by "highlighting" sections by either tapping on a section or moving the cursor of a mouse 1002. When a section is selected by a user, one or more CSS selectors such as "id" or "class" attributes are applied to the HTML element wrapping the highlighted content area 1003. The user is also given the option to name these sections so that the name of these section can be displayed in a later report next to the sections. Associated embedded CSS with associated pseudo-classes event such as "hover", "focus" or "active" as described in the previous sections are also added to the HTML content 1004 so that when a user/recipient touches the selected tracked section, a tracking event is fired and a tracking image is retrieved from a remote server. One or more "touch-active" activating elements may also be inserted into the HTML under tracked sections.

The user interface can be configured to ensure that highlighted tracked sections do not overlap and to be able to detect contiguous or near contiguous sections of content.

A further enhancement, the user interface may be configured to automatically select HTML elements wider than a configured width, taller than a configured height as well as shorter than a configured height. The user interface may also be able to automatically optimize and suggest candidates for tracked sessions based on preset criteria and display to a user the selection sections by highlighting them on a user interface. When a user accepts a selection, CSS selectors such as "id" or "class" attributes are added to the elements and these selectors are associated with pseudo-classes to convert them into tracked sections that respond to user touch actions. The user interface may optimize for the widest elements that are shorter than a specific height, as well as to select elements that are contiguous vertically in the content.

The following is an exemplary process to select sections to be tracked. First, elements that are of interest to be tracked are identified by a user manually selecting the elements. Then the software locates containing elements wrapping such elements such that the containing elements either about each other or substantially abut or overlap. If no other section abuts such as on the sides, the sections may expand to the widest possible elements leaving minimal gaps on gutters (sides) or between other containing elements. The elements are then highlighted with a border or a change of background color to a user to allow the user to select the appropriate containing element. The containing elements are then converted to tracked sections.

Techniques to detect and highlight content sections within HTML content based on preconfigured dimension settings and preferences are known to those skilled in the art. As a further enhancement, after selectors and content is added by the user interface into the HTML content, the user is then given the option to export the HTML wherein the email content can be placed within an Email Campaign service to send the email out to recipients.

Figure 9:
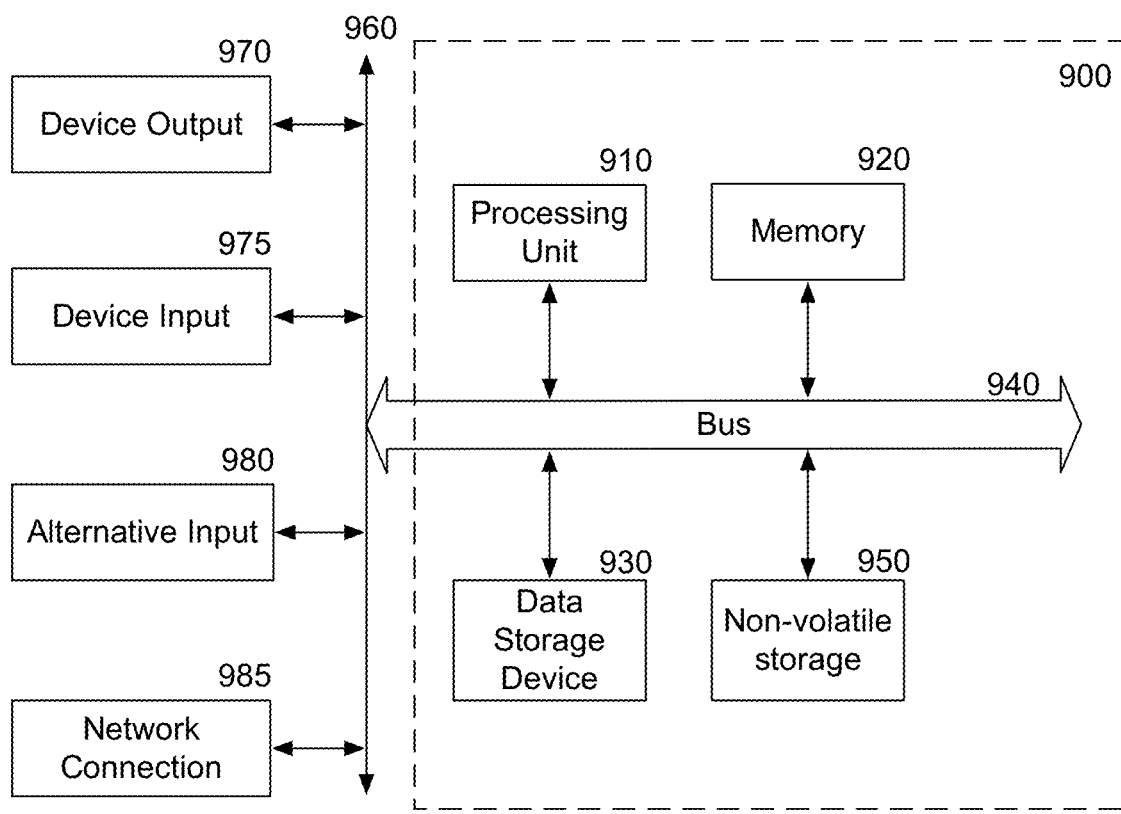
FIG. 9 is a block diagram of one embodiment of a computer system that may be used with the present invention.

FIG. 9 is a block diagram of one embodiment of a computer system that may be used with the present invention. It will be apparent to those of ordinary skill in the art, however that other alternative systems of various system architectures may also be used.

The data processing system illustrated in FIG. 9 includes a bus or other internal communication system 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random-access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment, the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.)

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 920, mass storage device 930, or other storage medium locally or remotely accessible to processor 910. For example, database 107 may be stored in main memory 902 or on a mass storage device 930. As an example, each of servers 103, 104, 105, 106 could be implemented using the hardware of FIG. 9. Similarly, client device 102 could be implemented using the hardware of FIG. 9. The software shown in FIG. 7 could be implemented using the hardware of FIG. 9 for each of the servers and client of FIG. 1.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 950 and/or 920.

The handheld device may be configured to include a set of buttons or input signaling components with which a user may select from a set of available options. These could be considered input device #1 1975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor X10. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infra-red signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for creating an email with trackable scrolling, comprising:
    placing a plurality of content containers within the email, wherein the plurality of content containers contain one of imagery and text, at least a first content container of the plurality of content containers is placed in a location in the email such that the first content container is not visible within the window of an email client without scrolling when the mail is opened in an email client;
    encoding a URL with a section identifier value for the first content container;
    associating a pseudo-class CSS selector with the first content container, the pseudo-class CSS selector responding to a user interaction on the first content container by making a request to a remote server using the encoded URL when activated by the user interaction on the first content container, thus allowing the remote server to record a scrolling distance and a scrolling time period that the user has scrolled the email sufficiently to make the first content container visible when the remote server receives the URL with the section identifier value for the first content container; and
    comparing, by the remote server, the scrolling distance and the scrolling time period with a second scrolling distance and a second scrolling time received for scrolling by a second user who opens a second email.

2. The method of claim 1 wherein ones of the plurality of content containers are associated with the same URL but have different section identifier values within the URL, indicating that different sections are identified by the different section identifier values.

3. The method of claim 1, wherein the URL contains a section identifier, a campaign identifier, and a recipient identifier.

4. The method of claim 1, wherein the URL contains tracking parameters including a section identifier.

5. The method of claim 1, wherein the user interaction is touch of a finger on content within the first content container.

6. The method of claim 1, wherein the request to the remote server results in nothing being returned from the remote server.

7. The method of claim 1, where the pseudo-class CSS selector comprises one of a :hover :active, :focus and :target selector.

8. The method of claim 1, further comprising:
    detecting repeated user action using an animation within at least one of the plurality of content containers, where the animation is active when its container is active and otherwise paused, the animation making at least two URL requests, a predefined time apart to the remote server.

9. The method of claim 1, further comprising
    generating, by the remote server, a visual map of aggregate user actions using data collected by the remote server comprising a heat map of the plurality of content containers for aggregate users scrolling interactions with instances of the email.

10. The method of claim 1, further comprising
    generating, by the remote server, a histogram of aggregate user actions using data collected by the remote server comprising a histogram of the plurality of content containers for aggregate users scrolling interactions with Instances of the email.

11. The method of claim 1, further comprising:
    providing a software tool that allows a sender of the email to edit the email to place the plurality of content containers within the email and that allows the sender to associate ones of the pseudo-class CSS selectors with tones of the plurality of content containers.

12. The method of claim 11, wherein the software tool automatically determines where to place the plurality of content containers within the email.

13. The method of claim 11, wherein the software tool allows the user to indicate where to place the plurality of content containers within the email.

14. The method of claim 1 where at least one "touch-active" activating element is positioned beneath and obscured by the plurality of content containers, such that when a touch event occurs on a content container, the touch event also occurs positionally on top of the "touch-active" activating element, the touch-active activating element causing the pseudo-class associated content container to become activated on a users touch.

15. The method of claim 14, where the "touch-active" activating element comprises one of an HTML range element, an HTML5 video element, and a HTML5 audio element.

16. The method of claim 1, wherein at least one content container encompasses the entire width of the visible text or image content of the email and at least two of the plurality of content containers are stacked vertically and positioned so that a gap between the content containers are less than the size of a tap area.

17. The method of claim 1, wherein section identifiers from at least two of the content containers received by the remote server allows the remote server to determine when the email has been scrolled.

18. The method of claim 1 where said URL is further encoded with a user identifier associated with said user and said remote server recording said user identifier and using the combination of said section identifier and said user identifier to determine the unique number of users that have scrolled to said first content container.

19. A method performed by a tracking server for tracking user interaction with multiple instances of an email, comprising:
receiving a first request for a URL from a first email client, the URL comprising a section identifier that identifies a section of a first instance of an email being interacted with by a first email recipient in a first email client, wherein the section was not initially displayed on a viewing screen of the first email client;
determining a first scrolling interaction in the first email client based on the section identifier in the URL requested by the first email client, the first scrolling interaction comprising a scrolling distance and a scrolling time period by the first email recipient;
receiving a second request for a URL from a second email client, the URL comprising a section identifier that identifies a section of a first instance of an email being interacted with by a second email recipient in a second email client, wherein the section was not initially displayed on a viewing screen of the second email client;
determining a second scrolling interaction in the second email client based on the section identifier in the URL requested by the second email client, the second scrolling interaction comprising a scrolling distance and a scrolling time period by the second email recipient; and
aggregating and comparing the first and second determined scrolling interactions to yield aggegated scrolling data indicating the first and second email recipients' scrolling interactions with the section of the email instances identified by the section identifier.

20. The method of claim 19, wherein aggregating comprises determining what percentage of the email recipients read the section of the email identified by the section identifier.

21. The method of claim 19, wherein aggregating comprises determining how many of the email recipients read the section of the email identified by the section identifier.

22. The method of claim 19, further comprising
receiving an additional request for an additional URL from the first email client, the URL comprising the section identifier that identifies a section of the first instance of the email being interacted with by the first email recipient; and
wherein the aggregating comprises determining how long the first email recipient reads the section based on the first request and the additional request.

23. A system, comprising:
an editor executed by a first processor executing instructions stored in a first memory that:
enables a user to place a content container within an email, wherein the content container contains one of imagery and text, and where the content container is placed in a location in the email such that the first content container is not visible within the window of an email client without scrolling when the email is opened in the email client, and
associates a pseudo-class CSS selector with the content container that responds to a user action on the content container by requesting data with a first URL from a remote server when activated by the user hovering on the content container, the first URL having a section identifier value identifying the content container; and
a tracking server executed by a second processor executing instructions stored in a second memory that receives a plurality of requests with the first URL and the section identifier value from at least one email client displaying one of a plurality of instances of the email with the content container, determining a scrolling distance and a scrolling time period for ones of the received plurality of request and aggregating and comparing the determined scrolling distance and the scrolling time period for the received plurality of requests.

24. The system of claim 23, further comprising:
a sender message server executed by a third processor executing instructions stored in a third memory that sends the plurality of instances of the email to a plurality of recipients, resulting in the plurality of requests to the tracking server when the plurality of recipients hover over the plurality of emails, the plurality of requests including a section identifier indicating which section of the email instances the respective recipients have hovered over.

* * * * *